Aug. 13, 1940.                R. SCHWARZ                2,211,586
                             LOCKING MEANS
                          Filed Sept. 15, 1939
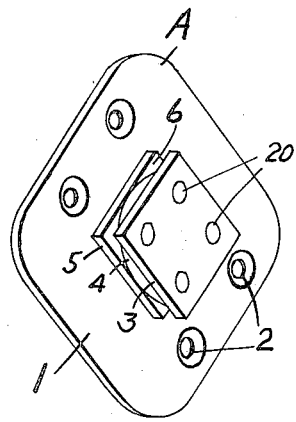
FIG.1.
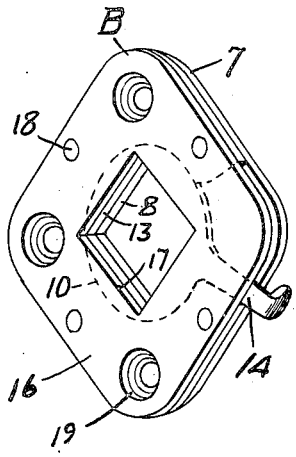
FIG.2.
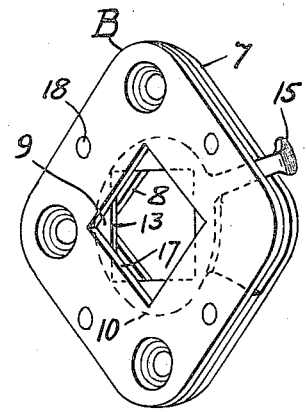
FIG.3.
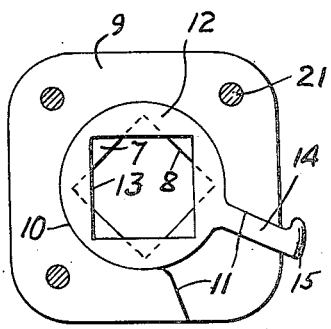
FIG.4.
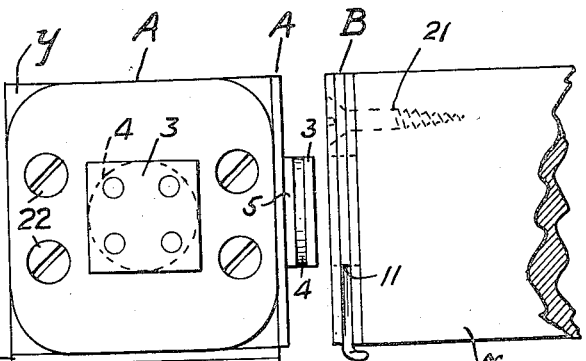
FIG.5.
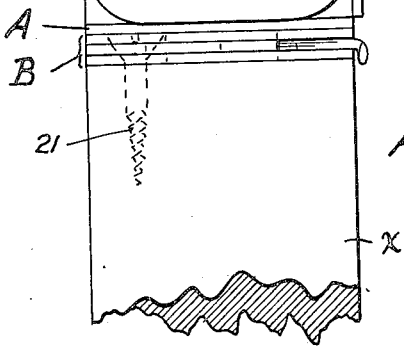
WITNESS:
Rob R Mitchel
INVENTOR
Rudolf Schwarz
BY
Burn & Harding
ATTORNEYS.

Patented Aug. 13, 1940

2,211,586

UNITED STATES PATENT OFFICE 2,211,586

LOCKING MEANS

Rudolf Schwarz, Liepaja, Latvia

Application September 15, 1939, Serial No. 295,001
In Latvia May 25, 1939

3 Claims. (Cl. 24—211)

This invention relates to an improvement in locking means and, more particularly, to locking means for securing members together in a manner rendering them readily collapsible.

More specifically the locking means according to this invention is adapted for use, for example, in cabinet work and in the construction of furniture, and the like, in which connection it enables the members forming, for example, a piece of furniture to be readily assembled and firmly secured, while at the same time permitting ready disassembly, as for storage, shipment, or the like.

Generally speaking the locking means according to this invention will comprise a bolt member and a keeper member, constructed so that they may be readily secured respectively to members to be secured together and so that they may be readily engaged and positively locked together and, at the same time, having been locked together so that they may be readily disengaged.

Having now indicated in a general way the nature and purpose of this invention, I will proceed to a detailed description of a preferred embodiment thereof, with reference to the accompanying drawing, in which:

Figure 1 is a perspective view of a bolt member.

Figure 2 is a perspective view of a keeper member in unlocked position.

Figure 3 is a perspective view of a keeper member in locked position.

Figure 4 is a plan view of the keeper member shown in Figures 2 and 3 with the top retainer plate removed.

Figure 5 is a view showing the adaptation of the locking means shown in Figures 1-4 for the securing together of a series of members.

Referring now more particularly to Figures 1-4, A, Figure 1, indicates the keeper member and B, Figures 2 and 3, indicates the lock member.

The keeper member A (Figure 1) comprises a base 1 drilled as at 2 for the passage of screws by which it may be secured to one of two members to be secured together. Secured centrally of the base member 1 by means of rivets 20 is a block 3 rounded as at 4 intermediate its ends 5, 5, which are preferably square, to form the spaced corner portion 6.

The bolt member B (Figures 2-4) comprises a base 7, having a centrally located square opening 8, dimensioned to receive the block 3 of member A. On the base 7 is a guide plate 9, provided with a centrally located round opening 10, and cut away, as at 11, Figure 4, adjacent one corner of the base 7. Resting on the base 7 and within the circular opening 10 in guide plate 9 is a circular bolt member 12, provided with a centrally located square opening 13 and with a member 14 extending laterally through the cut-out portion 11 to beyond the edge of the base 7. The free end of member 14 is desirably bent over or flanged as at 15.

Overlying the guide plate 9 and serving to retain the member 12 is a retainer plate 16 provided with a centrally located square opening 17.

The base 7, the guide plate 9 and the retainer plate 16 are riveted together by means of rivets 18 and are drilled as at 19 for the passage of screws by which the bolt member may be secured to one of two members to be secured together.

The square openings in the base 7 and the retainer plate 16 are of a size to receive the block 3 secured to base 1 and are in register. The square opening in the bolt member 12 is of the same dimensions as the square openings 8 and 17 and is adapted to be brought into and out of register with the openings 8 and 17 by rotation of the member 12 through manipulation of the member 14.

As will now, it is believed, be clear, if the member A is superimposed on the member B, the locking member 12 being in the position shown by dotted lines on Figure 2, with the block 3 entered in the aligned square openings 8, 9 and 17 of member B and the member 12 be rotated to bring the square opening therein out of alignment with the openings 8 and 17, as shown by dotted lines in Figure 3, portions of the member 12 will enter the spaces between the corners of the ends 5, 5 and the members A and B will be firmly and securely locked together. Obviously the members A and B may be readily released by turning member 12 to bring its square opening in line with the openings 8 and 17, as shown by dotted lines in Figure 2.

A practical adaptation of the device according to this invention is shown in Figure 5. Thus, to a member $x$ is secured the locking member B, by means of screws 21, while to a second member $y$ is secured the keeper member A, by means of screws 22. The members $x$ and $y$ are readily secured together by bringing them into position to bring the members A and B together and manipulating the member 14 to lock the members A and B together.

As will be obvious, the device may be used variously for securing members together in cabinet work, furniture construction and, in fact, in any art where disassembly of parts is desirable.

It will be understood that it is not intended that this invention shall be limited by the detailed description of a preferred embodiment given above for illustrative purposes, since it will be obvious that various modifications in detail may be made without departing from the scope of the invention as defined in the appended claims.

What I claim and desire to protect by Letters Patent is:

1. A locking device for locking two members together, comprising a bolt member and a keeper member; the bolt member comprising a base plate, a retainer plate and a guide plate between the base plate and the retainer plate, said guide plate having guiding means therein, means for rigidly securing the three plates to each other, a movable locking plate in the guiding means in the guide plate, there being registering openings through the base plate and the retainer plate, there being an opening through the locking plate arranged to be brought into and out of register with the openings in the plates on opposite sides thereof; the keeper member having a base plate with a keeper extending therefrom of the same contour as the openings in the plates of bolt members, said keeper having a groove adapted to receive a portion of the locking plate to lock the two members together when the keeper is within the bolt member and the locking plate is moved into locking position.

2. A locking device according to claim 1 characterized by the fact that the movable plate of the bolt member is rotatable.

3. A locking device according to claim 1 characterized by the fact that the several openings in the plates forming the bolt member are square, that the end portions of the keeper are square, and that the keeper between its ends is rounded.

RUDOLF SCHWARZ.